Patented Sept. 10, 1929.

1,728,114

UNITED STATES PATENT OFFICE.

ALBERT C. FISCHER, OF CHICAGO, ILLINOIS, ASSIGNOR TO THE PHILIP CAREY MANUFACTURING COMPANY, A CORPORATION OF OHIO.

EXPANSION-JOINT MATERIAL.

No Drawing. Application filed March 25, 1925, Serial No. 18,329. Renewed April 14, 1927.

Heretofore it has been customary to manufacture expansion joints out of blown asphalts, and previously fibrous matter was incorporated in the ordinary asphalts found on the market. It has not been customary, however, to incorporate this fibrous matter in with blown material or with material of an elastic nature as distinguished from a ductile substance.

There is available on the market a great deal of scrap roofing, partly saturated felts, etc. which could be well utilized for the purpose of incorporation by shredding such material and combining it with a blown asphalt and if sufficient rigidity is not secured in this mixture then reclaimed rubber or crude rubber or old tires, etc. shredded may be incorporated to secure an amalgamated mixture having an elastic nature, as compared with a ductile nature.

Various consistencies may be secured by incorporating different quantities of this scrap which would almost make a block-like rigid structure. It could be so incorporated that a spongy compressible nature could be imparted to the product, namely if small quantities are added, then such fibrous matter would be readily filled with asphalt and the mass would become subject to deflection due to warm atmospheric conditions.

On the other hand if 20 to 30% of this scrap shredded material is added, then the body becomes quite porous and much of the fibre remains unsaturated and cells predominate in the mixture. If to this mass is added an elastic substance such as reclaimed rubber, cut back crude rubber or shredded vulcanized rubber, additional resiliency is obtained without impairing the mass formation.

The preferred method which I employ is to use scrap roofing material shredding same fine and incorporating same in a blown asphalt having a melting point of approximately 240°. To such mixture should be added from 5 to 10% in weight of shredded tire scrap, reclaimed rubber or cut back crude rubber. This is then rolled into sheets and formed into a board-like structure which is highly resilient and resists stresses readily.

A substitute for the blown asphalt can be made by using an asphalt flux or road oil and by adding thereto latex in an uncoagulated form, then adding to this mixture the fibrous roofing scrap material in shredded form and if desirable shredded vulcanized rubber matter. The latter combination would undoubtedly be a much cheaper combination and mixture for the trade than that previously mentioned, but it would not be as stiff and rigid as my preferred form.

The rubber materials herein described will preferably be shredded matter of such materials as old tires, rubber scrap, etc. If crude rubber is employed, it will be necessary to cut the crude rubber back with a suitable solvent such as naphtha, carbontetra-chloride, kerosene, etc. The shredded material is preferably shredded roofing scrap which may be either partially or entirely saturated and which may have incorported therein mineral granules.

The object of my invention is to utilize materials for this purpose which would create a cheap effective expansion joint by utilizing materials which otherwise go to waste.

In describing my invention I wish to distinguish between road oils and asphalt residues as being slimy, slow pouring, viscous material which nature is changed by the incorporation of uncoagulated latex. Without the addition of uncoagulated latex, it would be difficult to form a body structure which would stand the warm atmospheric conditions without wilting. The sides of the joint to prevent adhesion may be suitably dusted and coated with a white-wash solution, soap solution or dusting material as is customary and known to the art in preventing adhesion of various paraffine papers, wat rproofing papers, roofing materials and expansion joints heretofore on the market.

The products themselves are readily acquired and it is in the peculiar combination that a product is produced which is distinguished by elasticity rather than ductility. A ductile substance upon pressure usually elongates and does not contract after release of the pressure. This is particularly true of blown asphalts which are not mineralized or rubberized and more or less free from sulphur.

On the other hand by an elastic substance I refer to a substance which can be elongated and upon release of the pull or pressure there will be a contraction of the material in the manner of a rubber-band, although not in so exaggerated a form because of a smaller percentage of true pure elastic material. The cells as described in this process are largely developed by interstices between the shredded material and aeration due to the presence of shredded material which cannot well be penetrated.

In making up expansion joint material I would ordinarily proceed by first preparing the bituminous material so as to accommodate it for the addition of the fibrous material.

This preparation of the bituminous material would simply consist in melting it down to a semi-fluid or fluid consistency and collecting a measured quantity of the same in a mechanical mixer. The mixer would ordinarily be equipped with some heating means so as to retain the bituminous material at the desired consistency. If I were to use uncoagulated latex I would incorporate the same with the bituminous material prior to the incorporation of the fibrous material, and this also applies to any other rubber content that I would use, providing, of course, the content was in a liquid form or semi-liquid form. If I wanted to use any residual oil, such as, road oil, asphalt flux, I would incorporate the same at this mixing stage. After the liquid rubber and/or the uncoagulated latex had been incorporated, I then proceed, of course while the mixer is operating, to incorporate the shredded fibrous material. I would not incorporate the full amount of shredded fibrous material at one time, but add the same in successive stages so as to insure a proper mix. After the materials have been thoroughly mixed the same would be removed from the mixer, and while still warm and in a plastic condition I would run the mixture thru sheet forming rolls and finally cut the sheets into strips. When I speak of road oil, asphalt flux, residual oil, I of course include these under the classification of bituminous material. Residual oil is nothing more than the residue obtained from the distillation of paraffine bearing petroleum, the steam or the dried distillation of mixed-base petroleums and the steam distillation of asphalt bearing petroleum. Road oil is a term applied to the residual asphalts of liquid and semi-liquid consistency. All these headings come under the class of bituminous material, and in using the term "bituminous material" in the claims I intend that it should embrace these various forms.

Having thus described my invention I claim:

1. A preformed expansion joint comprising a strip of bituminous material containing a rubber content in sufficient quantity to add elasticity to the strip, and having incorporated therewith shredded fibrous material.

2. A preformed expansion joint containing approximately 60 per cent plastic bituminous material, about 10 per cent elastic material and about 20 per cent fibrous material.

3. A preformed constructional strip containing a predominant proportion of normally plastic bitumen, a rubber containing ingredient and fibrous material.

4. A preformed expansion joint containing a predominant proportion of plastic waterproof binder, shredded roofing scrap and shredded scrap containing a rubber ingredient.

5. A preformed expansion joint comprising a strip of bituminous material containing a rubber content in sufficient quantity to add elasticity to the strip, and having incorporated therewith fibrous material.

ALBERT C. FISCHER.